United States Patent [19]

Blakey et al.

[11] 4,174,703
[45] Nov. 20, 1979

[54] SOLAR HEAT ROOFING SYSTEM

[75] Inventors: Bruce H. Blakey, Seattle, Wash.; Douglas R. Pohl, Ogden, Utah

[73] Assignee: Western Marine Electronics, Inc., Seattle, Wash.

[21] Appl. No.: 801,544

[22] Filed: May 31, 1977

[51] Int. Cl.$^2$ ............................................. F24J 3/02
[52] U.S. Cl. ................................. 126/430; 126/428; 52/788
[58] Field of Search ................ 126/270, 271; 52/616; 237/1 A

[56] References Cited

U.S. PATENT DOCUMENTS

| 3,215,134 | 11/1965 | Thomason | 126/271 |
|---|---|---|---|
| 3,995,804 | 12/1976 | Folds et al. | 126/271 |
| 4,000,850 | 1/1977 | Diggs | 126/271 |
| 4,016,861 | 4/1977 | Taylor | 126/270 |
| 4,063,544 | 12/1977 | Bowen | 126/271 |
| 4,063,547 | 12/1977 | Gruettner | 126/271 |

Primary Examiner—John J. Camby
Assistant Examiner—Larry I. Schwartz
Attorney, Agent, or Firm—Seed, Berry, Vernon & Baynham

[57] ABSTRACT

A solar heat roofing system including a plurality of waterproof heat absorbing panels covering substantially the entire roof of a building. The panels are formed by a pair of waterproof sheets connected to each other by elongated spacers thereby forming a plurality of fluid channels extending between the ends of the panels. A plurality of upstanding, spaced apart glazing mounts extend along the upper surfaces of the panels parallel to the spacers, and a plurality of elongated glazing supports are positioned between the glazing mounts. The glazing mounts and supports are positioned such that they follow a regular pattern when adjacent panels overlap each other. Transparent or translucent sheets are then placed in the glazing mounts with the upper surface of the glazing support contacting the underside of the sheet. The transparent or translucent sheets provide a "greenhouse effect" to increase the heat absorption of the panels, and they provide protection for the panels. The ends of the panels fit into elongated slots formed in inlet and outlet manifolds by linear, laterally projecting flanges. The manifolds, which are also secured to the roof, contain a fluid conduit communicating with the slots. Consequently, heat transfer fluid flowing into the inlet manifold conduit flows through the fluid channels in the panel where heat is absorbed, and the transfer fluid then flows from the outlet manifold conduit to a heat utilization device.

4 Claims, 5 Drawing Figures

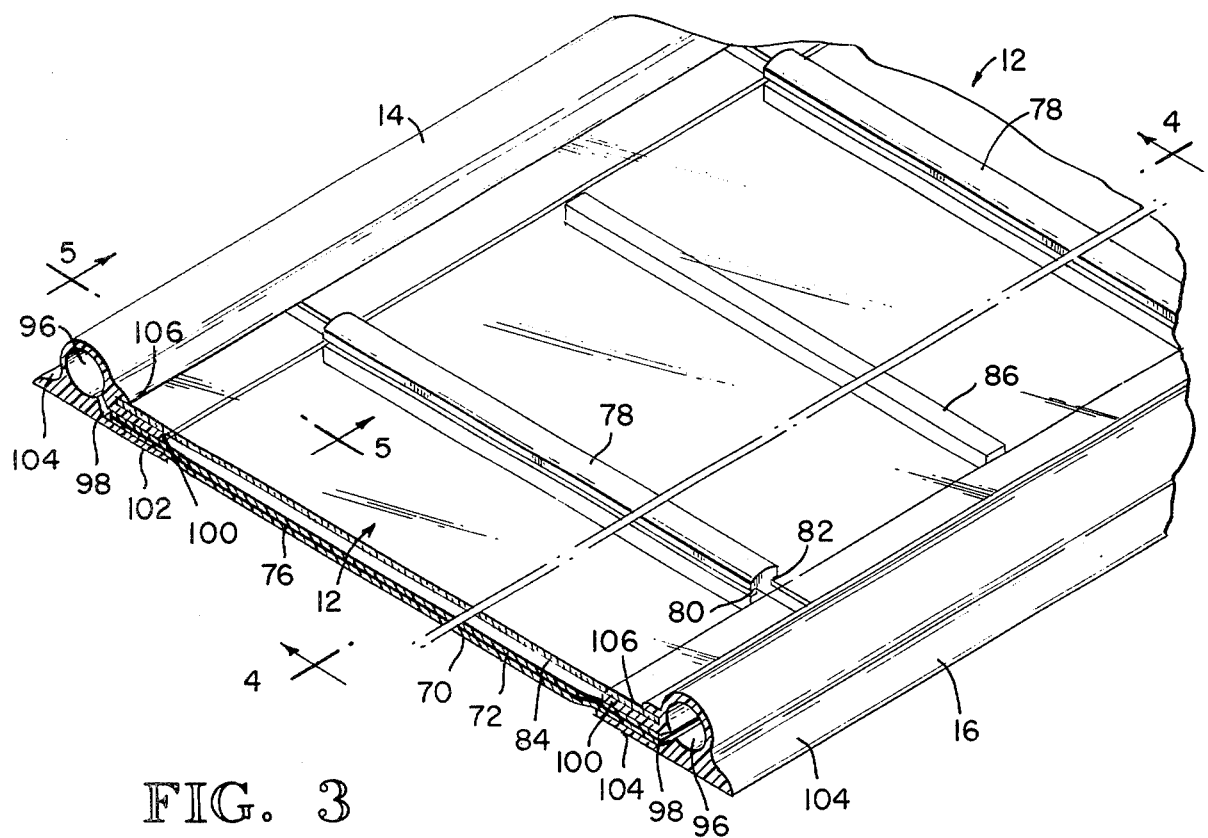
FIG. 3
FIG. 4
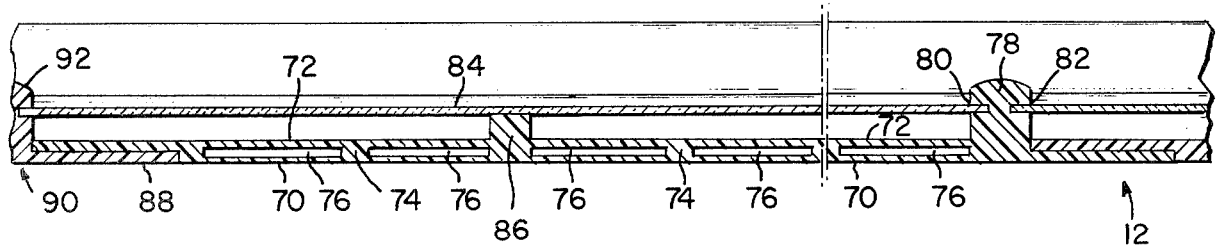
FIG. 5
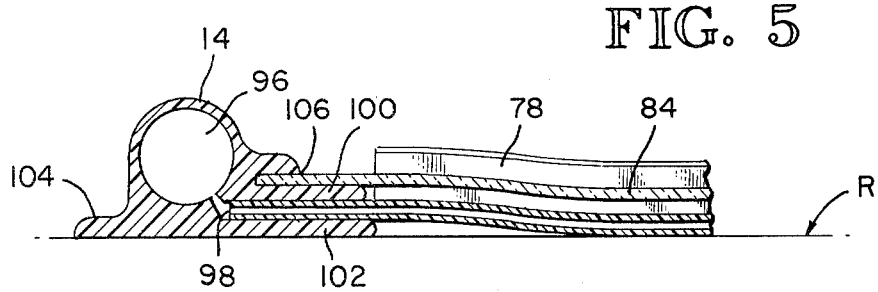

SOLAR HEAT ROOFING SYSTEM

BACKGROUND OF THE INVENTION

1. Field of the Invention

This invention relates to roofing systems, and, more particularly, to a roofing system which absorbs solar heat and conducts the absorbed heat to a heat utilization device.

2. Description of the Prior Art

Many systems have been devised for collecting solar heat and conveying the heat to a utilization device. With the increasing prospect of fossil fuels shortages, the collection of solar energy in this manner becomes increasingly attractive. Generally, conventional collecting systems have utilized heat absorbing panels containing fluid passages through which a heat transfer fluid continuously flows. Generally, these heat absorbing panels are of standardized size and are horizontally supported, often on the roof of a building. A primary disadvantage of conventional solar energy conversion systems has been their relatively high cost particularly where the panels cover a large surface area.

SUMMARY OF THE INVENTION

It is an object of the invention to provide a solar heat utilization system which also forms the roofing of a building so that the cost of the system is offset to some extent by the lack of a conventional roof.

It is another object of the invention to provide a solar heat roofing system which covers a relatively large area and is thus capable of absorbing a relatively large amount of heat.

It is still another object of the invention to provide a solar heat roofing system which may be easily and quickly installed.

It is a still further object of the invention to provide a solar heat roofing system which is extremely rugged and capable of providing many years of trouble free service.

These and other objects of the invention are accomplished by a solar heat roofing system for waterproofing the roof of a building and for transferring solar heat to a heat utilization device through a heat transfer fluid. The system includes a plurality of waterproof, heat absorbing panels covering substantially the entire surface of the roof. Each of the panels includes upper and lower waterproof sheets connected to each other by elongated spacers which form elongated fluid channels for the transfer fluid. The ends of the panels fit into continuous slots extending along the sides of inlet and outlet manifolds. The manifolds include a fluid conduit communicating with the slots so that the heat transfer fluid may flow into the inlet manifold conduit, through the fluid channels in the panel and out the outlet manifold conduit. The panels also include upstanding, elongated glazing mounts extending along the upper surface of the panel parallel to each other and to the spacers. The sides of the mounts include continuous, horizontal slots adapted to receive the longitudinal edges of transparent or translucent sheets. A plurality of upstanding, elongated glazing supports extending along the upper surface of the panel project upwardly to a level approximately equal to the level of the slots for supporting the transparent or translucent sheets midway between the glazing mounts.

BRIEF DESCRIPTION OF THE DRAWINGS

FIG. 3 is an isometric view of a heat absorbing panel extending between a pair of manifolds.

FIG. 4 is a cross-sectional view taken along the line 4—4 of FIG. 3.

FIG. 5 is a cross-sectional view taken along the line 5—5 of FIG. 3.

DETAILED DESCRIPTION OF THE PREFERRED EMBODIMENT

Figure 1:
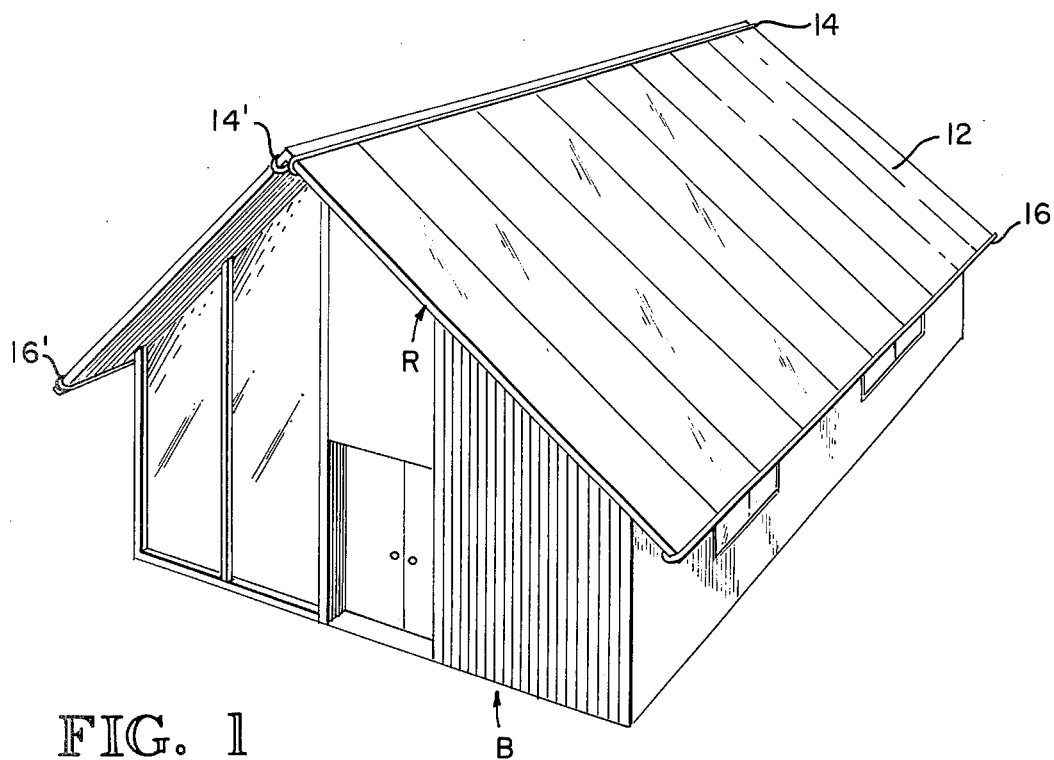
FIG. 1 is an isometric view of the roofing system installed on a building.

The inventive solar heat roofing system is illustrated in FIG. 1 installed on a conventional building B having a roof R formed by non-waterproof sheathing secured to conventional rafters. The system includes a plurality of heat absorbing panels 12, 12' overlapping each other and covering substantially the entire surface of the roof R. The upper ends of the panels 12, 12' terminate in respective, elongated inlet manifolds 14, 14' running along the ridge of the roof, and the lower edges of the panels 12, 12' terminate in respective, elongated outlet manifolds 16, 16' running along the eves of the roof R.

In operation, a heat transfer fluid is pumped into the inlet manifolds 14, 14' and is distributed to all of the panels 12, 12'. The fluid then flows downward through the panels 12, 12' absorbing solar heat. The increased temperature heat transfer fluid is then collected in the outlet manifolds 16, 16' which delivers the fluid to a heat utilization device before being recirculated to the inlet manifolds 14, 14'. Since the panels 12, 12' are waterproof and weather-resistant, the panels 12, 12' replace conventional roofing such as asphalt shingles or shakes. Consequently, the cost of the solar heat roofing system is offset to some extent by the lack of expense of conventional roofing.

Figure 2:
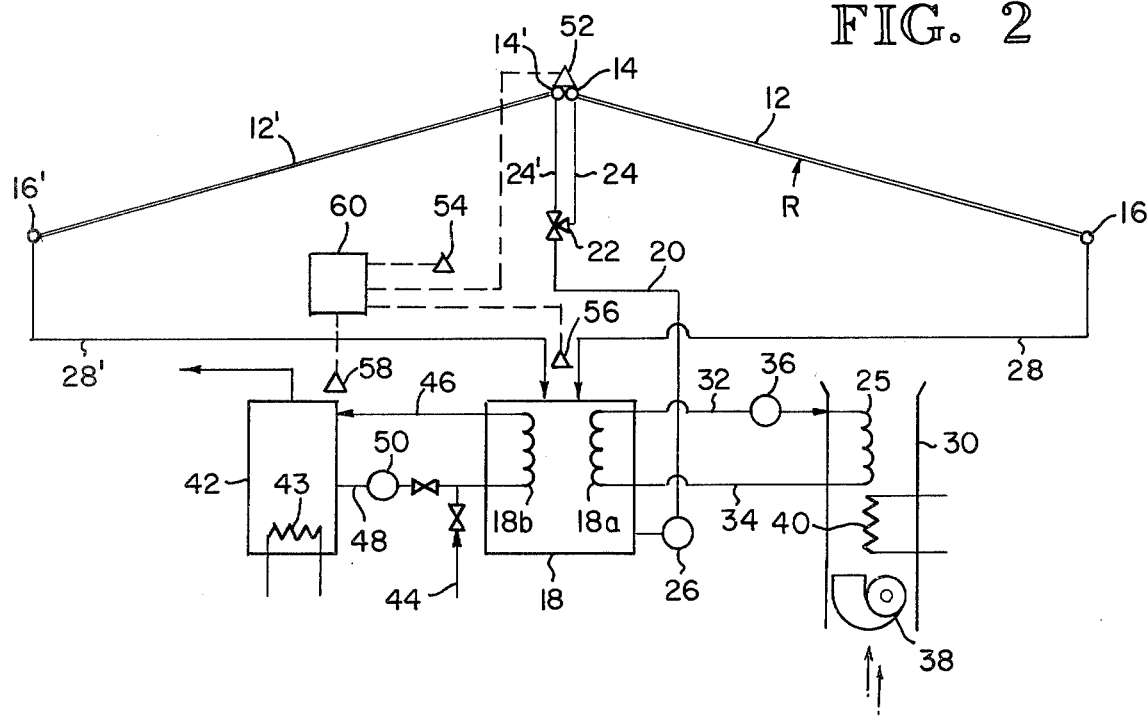
FIG. 2 is a schematic of a complete solar heat roofing system including heat absorbing panels, heat utilization devices and heat transfer fluid pumping devices.

An overall schematic of the roofing system including the heat exchanging and pumping unit is illustrated in FIG. 2. A large quantity of heat transfer liquid such as water is contained in a tank which functions as a heat reservoir 18. The liquid is delivered to the inlet manifolds 14, 14' through conduit 20, T-connection 22 and supply conduits 24, 24' by a conventional pump 26. The transfer fluid flows through the panels 12, 12' where its temperature is raised by solar heat before being collected by the outlet manifolds 16, 16'. The increased temperature heat transfer fluid then returns to the heat reservoir 18 through conduits 28, 28'. Thus the heat transfer fluid continuously recirculates through the heat absorbing panels 12, 12' and the heat reservoir 18.

Heat is transferred from the heat reservoir 18 to a heat utilization device 30 by recirculating heat transfer fluid through a heat exchanger coil 18a in the heat exchanger 18 to a heat exchanger coil 28 in the heat utilization device 30. This recirculation is accomplished by pumping the fluid through conduits 32, 34 and the coils 18a, 28 with a conventional pump 36. Although a variety of heat utilization devices may be used with the inventive system, the heat utilization device 30 in FIG. 2 is a furnace having a duct through which air is forced into the interior of the building by a conventional fan 38. An electric heating element 40 is provided to heat the air entering the building when the temperature of the fluid in the heat reservoir 18 is insufficient.

The solar heat roofing system may also be used to heat water stored in a hot water tank 42. Cold water entering the system through conduit 44 flows through a heat exchanger coil 18b in the heat reservoir 18 and through conduit 46 into the tank 42. Alternatively, the water in the tank 42 may be recirculated through conduit 48 and coil 18b by a conventional pump 50. An electric heating element 43 is provided to heat the water in the tank 42 when the temperature of the transfer fluid in the reservoir 18 is lower than the temperature of the water in the tank 18.

The operation of the system will ideally depend upon such considerations as the amount of heat available from the sun, the temperature inside the building, the temperature of the water inside the heat reservoir 42 and the temperature of the heat transfer fluid in the heat reservoir 18. The system may be automated to optimize system performance as these environmental considerations vary. For this purpose, a conventional light sensor 52 is placed on the ridge of the roof R, and temperature sensors 54, 56 and 58 are placed in the building B, the heat reservoir 18 and the hot water tank 42, respectively. These sensors 52–58 are connected to a conventional control system 60 which actuates the pumps 26, 34 and 50 responsive to predetermined conditions. For example, it is generally not desirable to actuate pump 26 at any predetermined output from sensor 52 since the pump 26 should be actuated only when sufficient solar heat is available to raise the temperature of the transfer fluid in the heat reservoir 18. Since this value depends on the temperature of fluid in the reservoir 18, the output of sensor 52 should be compared to the output of sensor 56. Similarly, pump 50 the temperature of the fluid in the tank 18 as measured by sensor 56 exceeds the temperature in the tank 42 as measured by sensor 58.

The construction of the panels 12, 12' is illustrated in greater detail in FIGS. 3–5. The panel 12 includes a lower waterproof sheet 70 and an upper waterproof sheet 72 connected to each other through elongated spacers 74 thereby forming elongated fluid channels 76 between the sheet 70, 72. It will be understood, however, that the fluid channels 76 may be formed by connecting the sheets 70, 72 to each other along spaced apart, linear parts utilizing other techniques such as by bonding the sheets 70, 72 to each other. The sheets 70, 72 may be formed of a variety of waterproof materials. However, a chlorosulfonated polyethylene material commonly sold under the trademark Hypalon may be advantageously used.

A plurality of elongated, spaced apart glazing mounts 78 project upwardly from the top surface of the panel 12. The glazing mounts 78 have formed therein continuous horizontal slots 80, 82 which receive the longitudinal edges of a light transmissive (i.e. transparent or translucent) sheet 84. An upstanding, elongated glazing support 86 is positioned between each pair of adjacent glazing mounts 78. The upper surface of the glazing support contacts the underside of the light transmissive sheet 84 to prevent the sheet 84 from bending responsive to downward forces exerted on the sheet 84 by wind or snow, for example. If desired, the sheet 84 may have ultraviolet filtering properties to protect the panel from ultraviolet light deterioration.

As best illustrated in FIG. 4, the upper sheet 72 of the panel 12 projects to the left beyond the lower sheet 70 a distance equal to the distance that the lower sheet 88 of an adjacent panel 90 projects to the right beyond the upper sheet 92. Consequently, when the panel 12, 90 overlap each other at illustrated in FIG. 4 the thickness of the overlapping section is equal to the thickness of the remaining portions of the panels 12, 90.

As best illustrated in FIGS. 3 and 5, the ends of the panels 12 extend between manifolds 14, 16. The manifolds include an elongated fluid conduit 96 communicating with a continuous slot 98 extending continuously along one side of the manifold 94. The slot 98 is formed by a pair of laterally projecting, spaced apart, linear flanges 100, 102 extending along the length of the manifold 14. The glazing mounts 78 and glazing supports 86 are trimmed back from the ends a distance equal to the depth of the slot 98 so that the ends of the panels 12 are substantially planar, and the ends of the panels are inserted in the slots 98 and bonded in place with a suitable adhesive or sealant. A manifold 14 may then be secured to the roof R by inserting a suitable fastener through a second flange 104 extending along the manifold 14 opposite the flanges 100, 102. A second slot 106 extending along the manifold 94 above the slot 98 receives the light transmissive sheet 84.

The system is preferably installed by first coating the roof with a suitable adhesive and then sequentially placing a plurality of panels 12 on the roof in overlapping configuration until substantially the entire surface of the roof has been covered. A coating of sealant is preferably placed between the overlapping portions of the panels 12. As each panel 12 is secured in place, a light transmissive sheet 84 is placed in the slots 80, 82 of the glazing mounts 78. The inlet and outlet manifolds 14, 16, respectively, are then placed over the ends of the panels 12 after the glazing mounts 78 and glazing supports 86 have been trimmed from the edges of the panels 12 by a distance equal to the depth of the slots 98. Finally, the manifolds 14, 16 are secured in place by inserting an appropriate fastener through the flange 104. Appropriate fluid handling devices such as pumps, heat storage reservoirs and heat utilization devices are then connected to the manifold conduits 96 by fluid conduits.

We claim:

1. A solar heat roofing system for waterproofing the roof of a building and for transferring solar heat to a heat utilization device through a heat transfer fluid, comprising:

a plurality of waterproof, heat absorbing panels including upper and lower waterproof sheets connected to each other along spaced apart linear paths thereby forming elongated channels for said transfer fluid extending from the top edges to the bottom edges of said panels with a side edge of each lower sheet projecting laterally beyond the adjoining side edge of said upper sheet by a first distance with the opposite side edge of said upper sheet projecting laterally beyond the adjoining side edge of said lower sheet by said first distance such that the upper sheet of each panel may overlap the lower sheet of an adjacent panel with the thickness of said overlapping portions being substantially identical to the remainder of said panel;

inlet and outlet manifolds extending perpendicularly to said fluid channels at opposite ends of said panel, each of said manifolds including an elongated, fluid impermeable conduit continuously communicating with a slot extending continuously along one side of said manifold, said slot receiving the respective end of said panel such that said fluid channels communicate with said conduit;

means for conveying said heat transfer fluid from said heat utilization device to the conduit of said inlet manifold; and means for conveying said heat transfer fluid from the conduit of said outlet manifold to said heat utilization device such that said heat transfer fluid recirculates through said panels thereby delivering heat to said heat utilization device and said panels waterproof the roof of said building.

2. The roofing system of claim 1 wherein said slots are formed by a pair of spaced apart, laterally projecting linear flanges extending along the length of said manifold from said conduit and receiving said panel therebetween.

3. A solar heat roofing system for waterproofing the roof of a building and for transferring solar heat to a heat utilization device through a heat transfer fluid, comprising:

a plurality of waterproof, heat absorbing panels including upper and lower waterproof sheets connected to each other along spaced apart linear paths thereby forming elongated channels for said transfer fluid extending from the top edges to the bottom edges of said panels with a side edge of each lower sheet projecting laterally beyond the adjoining side edge of said upper sheet by a first distance with the opposite side edge of said upper sheet projecting laterally beyond the adjoining side edge of said lower sheet by said first distance such that the upper sheet of each panel may overlap the lower sheet of an adjacent panel with the thickness of said overlapping portions being substantially identical to the remainder of said panel;

inlet and outlet manifolds extending perpendicularly to said fluid channels at opposite ends of said panel, each of said manifolds including an elongated, fluid impermeable conduit continuously communicating with a slot extending continuously along one side of said manifold, said slot receiving the respective end of said panel such that fluid channels communicate with said conduit;

means for conveying said heat transfer fluid from said heat utilization device to the conduit of said inlet manifold;

means for conveying said heat transfer fluid from the conduit of said outlet manifold to said heat utilization device such that said heat transfer fluid recirculates through said panels thereby delivering heat to said heat utilization device and said panels waterproof the roof of said building;

a plurality of upstanding, elongated glazing mounts extending along the upper surface of said panel parallel to each other and to said linear paths, the sides of said mounts each including a continuous horizontal slot such that the slots of each mount face away from each other and the slots of adjacent mounts face toward each other; and a plurality of elongated light transmissive sheets having their longitudinal edges received in the slots of adjacent mounts with the top surface of said support intermediate said mounts contacting the other side of said glazing panel, the centers of said glazing mounts being laterally spaced apart from each other by a second distance, and wherein one side edge of said upper sheet is laterally spaced a third distance from the center of an adjacent glazing mount and the opposite side edge of said upper sheet is laterally spaced a fourth distance from the center of an adjacent glazing mount, the sum of said third and fourth distances being equal to said second distance such that when the top sheet of one panel overlaps the bottom sheet on an adjacent panel the distance between the glazing mounts of adjacent panels is said second distance.

4. A method of installing a solar heat roofing system on the roof of a building, the components of said system including heat absorbing panels having upper and lower waterproof sheets connected to each other along spaced apart linear paths thereby forming elongated channels extending between opposite ends of said panel, and a plurality of upstanding, elongated glazing mounts adapted to support a light transmissive sheet extending along the upper surface of said panel parallel to each other and to said linear paths, said roofing system components further including elongated manifolds having a conduit extending along the length thereof and communicating with a continuous slot adapted to receive the ends of said panel therein, said method comprising:

coating said roof with an adhesive;

placing a plurality of said panels on said roof in overlapping configurations such that said panels cover substantially the entire surface of said roof and are bonded thereto by said adhesive;

trimming the ends of said glazing mounts away from said opposite ends a distance greater than the depth of the slots of said manifold such that the top surfaces of said panels at opposite ends thereof are substantially planar;

mounting said light transmissive sheets in said glazing mounts;

inserting the planar end of said panels into the slots of respective manifolds such that the conduits in said manifolds communicate with the channels in said panel; and securing said manifolds to said roof.

* * * * *